US009003405B1

(12) United States Patent
Hotra

(10) Patent No.: US 9,003,405 B1
(45) Date of Patent: Apr. 7, 2015

(54) SYNCHRONIZATION OF VIRTUAL MACHINE-BASED DESKTOP ENVIRONMENTS

(75) Inventor: Jonathan N. Hotra, St. Louis, MO (US)

(73) Assignee: The Boeing Company, Chicago, IL (US)

(*) Notice: Subject to any disclaimer, the term of this patent is extended or adjusted under 35 U.S.C. 154(b) by 220 days.

(21) Appl. No.: 13/477,906

(22) Filed: May 22, 2012

(51) Int. Cl.
G06F 9/455 (2006.01)

(52) U.S. Cl.
CPC .................. G06F 9/45558 (2013.01)

(58) Field of Classification Search
None
See application file for complete search history.

(56) References Cited

U.S. PATENT DOCUMENTS

| | | | |
|---|---|---|---|
| 6,055,619 A * | 4/2000 | North et al. ..................... 712/36 |
| 7,870,296 B2 * | 1/2011 | Fukutomi et al. ............ 709/248 |
| 8,020,041 B2 * | 9/2011 | Huang et al. ..................... 714/11 |
| 2004/0012612 A1 * | 1/2004 | Chan et al. ..................... 345/619 |
| 2011/0055518 A1 | 3/2011 | Hotra et al. |
| 2012/0096458 A1 * | 4/2012 | Huang et al. ..................... 718/1 |
| 2013/0198739 A1 * | 8/2013 | Razdan et al. ..................... 718/1 |

* cited by examiner

*Primary Examiner* — Emerson Puente
*Assistant Examiner* — Zhi Chen
(74) *Attorney, Agent, or Firm* — Toler Law Group, PC

(57) ABSTRACT

Systems, methods, and computer program products to synchronize software processes in a virtual machine environment are described herein. In one embodiment, a computer-based system comprises at least one processor, first logic instructions stored in a tangible computer readable medium which, when executed by the at least one processor, configure the at least one processor to define at least a first virtual machine and a second virtual machine, both of which execute on the at least one processor, and second logic instructions stored in a tangible computer readable medium which, when executed by the at least one processor, configure the at least one processor to synchronize execution of operations on the first virtual machine and the second virtual machine.

20 Claims, 7 Drawing Sheets

SYNCHRONIZATION OF VIRTUAL MACHINE-BASED DESKTOP ENVIRONMENTS

BACKGROUND

The subject matter described herein relates to electronic computing, and more particularly to systems, methods, and computer program products to synchronize software processes in a virtual machine environment.

Some software requires a deterministic operating environment. By way of example, vehicle control software in the aerospace industry may expect a particular rate of execution in an operating environment. Further, vehicle control software in the aerospace industry may be configured to execute redundantly on multiple separate channels, i.e., separate processors and communication paths. Proper execution of such software requires a level of synchronization between the multiple channels. Accordingly, systems, methods, and computer program products which enable a virtual machine environment to emulate a deterministic execution environment may find utility.

SUMMARY

Embodiments of systems and methods in accordance with the present disclosure may synchronize software processes in a virtual machine environment. In one embodiment, a computer-based system comprises at least one processor, first logic instructions stored in a tangible computer readable medium which, when executed by the at least one processor, configure the at least one processor to define at least a first virtual machine and a second virtual machine, both of which execute on the at least one processor, and second logic instructions stored in a tangible computer readable medium which, when executed by the at least one processor, configure the at least one processor to synchronize execution of operations on the first virtual machine and the second virtual machine.

In another embodiment, a computer based method comprises defining at least a first virtual machine and a second virtual machine, both of which execute on at least one processor and configuring the at least one processor to synchronize execution of operations on the first virtual machine and the second virtual machine.

In another embodiment, a computer program product comprises first logic instructions stored in a tangible computer readable medium which, when executed by a processor, configure the processor to define at least a first virtual machine and a second virtual machine, both of which execute on a processor and second logic instructions stored in a tangible computer readable medium which, when executed by the processor, configure the processor to synchronize execution of operations on the first virtual machine and the second virtual machine.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Figure 1:
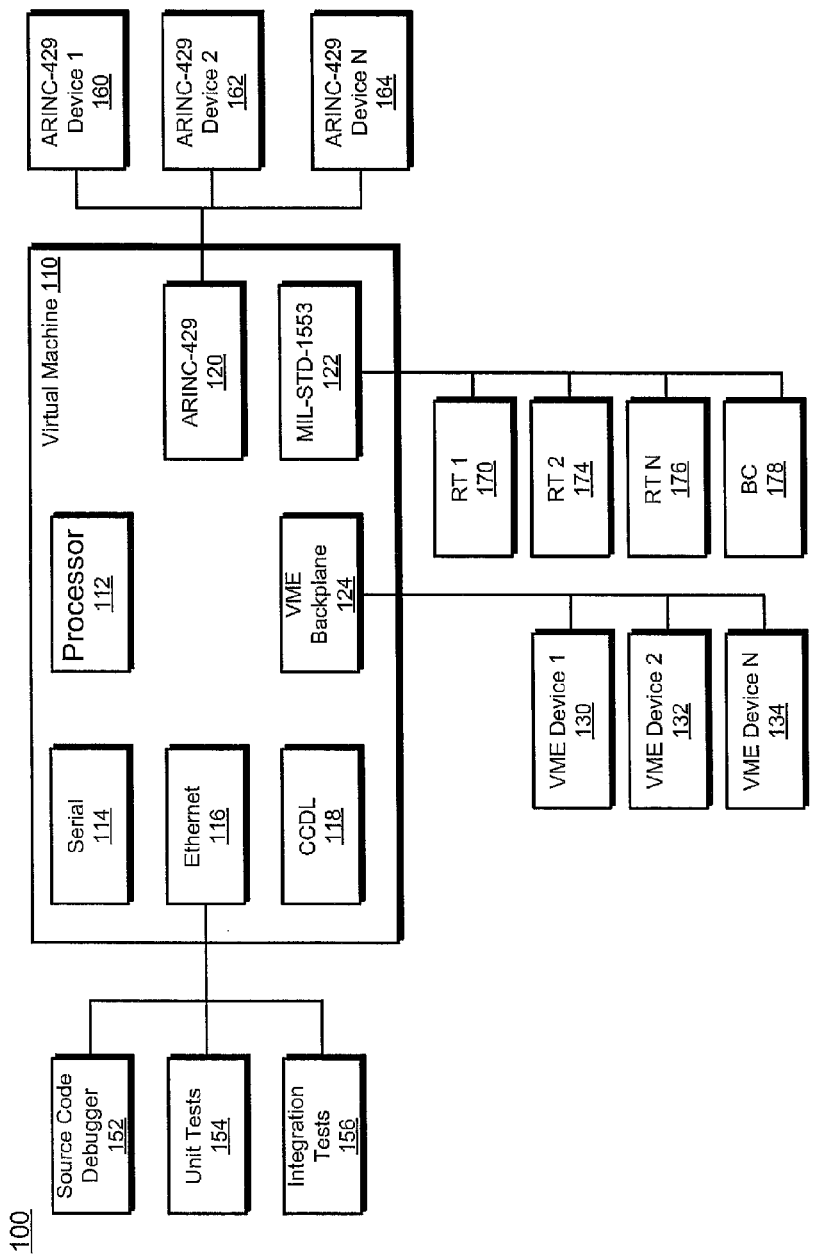
FIG. 1 is a schematic illustrations of a virtual test platform for an aerospace application according to embodiments.

Systems and methods, and computer program products to synchronize software processes in a virtual machine environment are described herein. In some embodiments, a virtual machine environment having at least two virtual machines may be established on a computer system. The virtual machines may share hardware and software resources and may execute on the same operating system or on different operating systems. The virtual machines may be used to emulate redundant operating environments for software such as, e.g., control software for an aircraft or the like.

As described above, some software such as, e.g., control software may be written to execute on in a deterministic environment. Specially designed operating systems may be used to achieve deterministic behavior on hardware in a complex computer-based system. Another way that deterministic behavior can be achieved is to run directly on the hardware without an OS, sometimes referred to as "bare metal" execution.

A virtual machine can support many types of software, including real-time operating systems and bare metal execution applications. However, utilizing a real-time operating system in a virtual machine does not imply that the software will run in deterministic manner, because in most virtualized systems the virtualization layer is not designed for real-time behavior. This is particularly true for a Desktop Test Environment (DTE). One of the primary goals of a desktop environment is that it can run on a standard computer with a general purpose operating system, just like any other application a user might have on their computer.

General purpose operating systems are designed to provide fairness in the execution of applications. Even if a real-time priority is set on an application, it is often taken as a suggestion by a general purpose operating system and is not always strictly enforced. In many instances an operating system views a virtual machine as another a process running on top of a general purpose operating system. Even in cases in which a real-time operating system runs inside of the virtual machine, the general purpose operating system will preclude the real-time operating system from operating in a real-time manner.

Processor core affinities can be used in a general purpose OS to cause a virtual machine to have an affinity to a processor core. A processor core affinity may provide more effective load balancing of the virtual machine in a system, but does not grant exclusive access to a processor core for the virtual machine. Because the virtual machine does not have exclusive access to a processor core, variations may develop in the execution of the virtual machines that lead to loss of synchronization and loss of determinism in a system.

Techniques to emulate a deterministic operating environment in virtual machines which may execute in a non-deterministic computing environment are described herein. Real-time and/or deterministic software often operate in terms of frames of execution. Time is divided into frames and the frames have activities scheduled within them. The start of frame activity is an event that may be synchronized. Frames may be started with a timer interrupt or by other methods, e.g. the arrival of a certain I/O message, processor counters reaching a certain count divided by the frame interval count, etc. A synchronization point at the start of frame for all virtual machines executing in an environment ensures that all frames start at the same time point, thereby removing inter-frame jitter in a system.

However, virtual machines which execute on general purpose operating systems may suffer variations in the execution of a frame which results in intra-frame jitter. Additional synchronization points may be implemented to achieve synchronization of the system. Activities that require synchronization points are typically found at inter-virtual machine communications, e.g. cross-channel datalinks, cross-channel discretes, and other forms of I/O. Not all cross-channel events require a synchronization point. Rather, synchronization points only need to be implemented at events in which the software inside the virtual machine is looking for another channel event to occur to determine if execution is proceeding as expected require synchronization points.

Perfect synchronization could be achieved by implementing a synchronization point on every clock cycle. However, this would severely impact performance of the system. Using fewer, strategically placed synchronization points allows for parallel execution of the virtual machines between synchronization points executing on the general purpose operating system while leading to a desktop environment that can often run as fast or faster than the software running on the real hardware target. Thus, techniques to implement adroit management of synchronization points in virtual machine environments may find utility.

Specific details of certain embodiments are set forth in the following description and in FIGS. 1-7 to provide a thorough understanding of such embodiments. One skilled in the art will understand, however, that alternate embodiments may be practiced without several of the details described in the following description.

FIG. 1 is a schematic illustration of a virtual test platform 100 for an aerospace application according to embodiments. Referring to FIG. 1, virtual test platform 100 may comprise one or more virtual machines 110 which may, in turn, comprise a processor(s) with one or more cores 112, a serial input/output port 114, an Ethernet port 116, a Cross Channel Data Link (CCDL) module 118 which communicates with other VMs, an ARINC-429 input/output module 120, a MIL-STD-1553 module 122, and a VME backplane 124.

The Ethernet port 116 provides a communication connection with a source code debugger module 152, one or more unit tests 154, and one or more integration tests 156.

The VME backplane 124 provides a communication connection with a plurality of virtual components including VME Device 1 130, VME Device 2 132, VME Device N 134.

The ARINC-429 port 120 provides a communication connection with an ARINC-429 Device 1 160, an ARINC-429 Device 2 162, and an ARINC-429 Device N 164.

The MIL-STD-1553 port 122 provides a communication connection with a Remote Terminal (RT) 1 170, a RT 2 174, a RT N 176, and a Bus Controller (BC) module 178.

Figure 2:
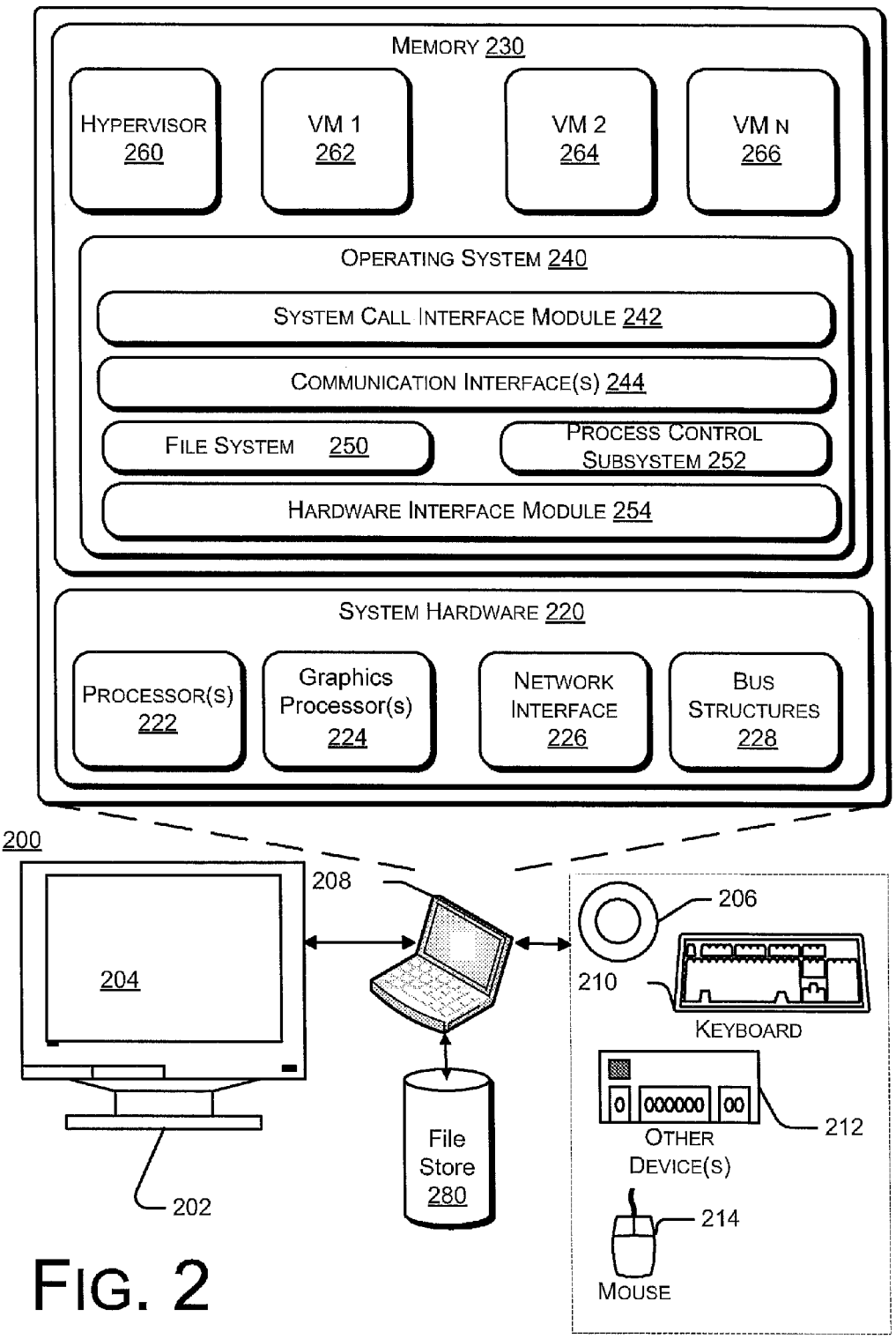
FIG. 2 is a schematic illustration of a computing device which may be adapted to synchronize software processes in a virtual machine environment in accordance with some embodiments.

In some embodiments the virtual test platform 100 depicted in FIG. 1 may be implemented in a computer system environment. FIG. 2 is a schematic illustration of a computing system environment 200 which may be adapted to synchronize software processes in a virtual machine environment in accordance with some embodiments. In one embodiment, system 200 includes a computing device 208 and one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing device 208 includes system hardware 220 and memory 230, which may be implemented as random access memory and/or read-only memory. A file store 280 may be communicatively coupled to computing device 208. File store 280 may be internal to computing device 208 such as, e.g., one or more hard drives, CD-ROM drives, DVD-ROM drives, or other types of storage devices. File store 280 may also be external to computer 208 such as, e.g., one or more external hard drives, network attached storage, or a separate storage network.

System hardware 220 may include one or more processors 222, a graphics processor(s) 224, network interfaces 226, and bus structures 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processors that manage graphics and/or video operations. Graphics processor(s) 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 220. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 230 may include an operating system 240 for managing operations of computing device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a Windows® brand operating system or as a UNIX operating system or any derivative thereof (e.g., Linux, Solaris, etc.), or other operating systems.

In various embodiments, the computing device 208 may be embodied as a computer system such as a personal computer, a laptop computer, a server, or another computing device.

In one embodiment, memory 230 includes one or more virtual machines 262, 264, 266, which may correspond to the virtual machine 110 depicted in FIG. 1. In addition, memory 230 may include a hypervisor module 260 to oversee operations of the virtual machines 262, 264, 266. In some embodiments, the hypervisor 260 may include logic instructions which, when executed, by the processor(s) 222, configure the processor(s) 222 to implement the operations to synchronize software processes in virtual machines 262, 264, 266.

Figure 3:
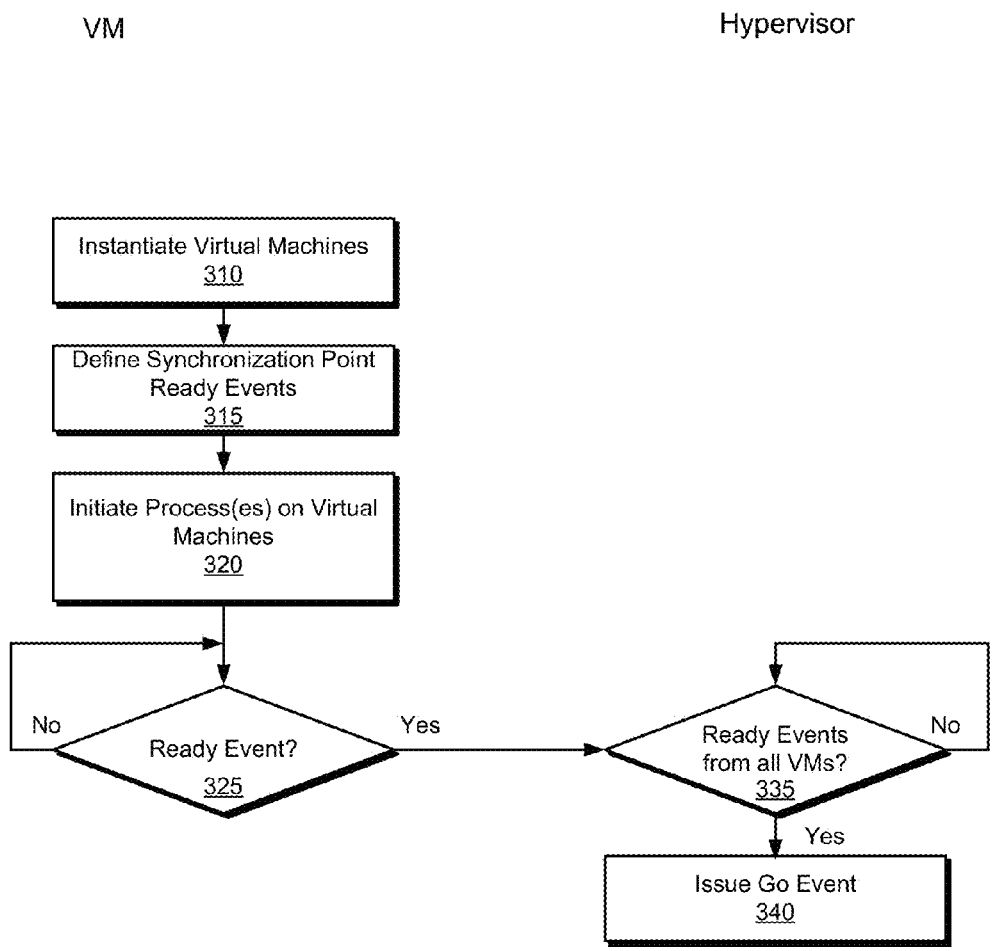
FIG. 3 is a flowchart illustrating operations to synchronize software processes in a virtual machine environment according to embodiments.

Having described the various components of a virtual test platform 100 and a computer system 200 in which multiple virtual machines may be implemented, various operations of the system will now be described. FIG. 3 is a flowchart illustrating operations in a method to synchronize software processes in a virtual machine environment according to embodiments. In some embodiments the operations depicted in FIG. 3 may be implemented by the hypervisor module 260, alone or in combination with other logic modules which may execute on computer system 200.

Referring now to FIG. 3, at operation 310 one or more virtual machines 262, 264, 266 are instantiated on a computer system 200. In some embodiments the virtual machines 262, 264, 266 may be instantiated using a processor emulator package such as the Quick Emulator (QEMU) package, which emulates a central processor, and virtualizes storage devices, graphics processors, and input output devices.

In some embodiments the virtual machines 262, 264, 266 may be configured to execute a test platform environment such as the platform depicted in FIG. 1 which simulates an operating environment for an aerospace application. As described above, the software which executes the operating environment for an aerospace application may expect that the virtual machines 262, 264, 266 operate in a deterministic manner such that operations may be synchronized. However, because the virtual machines 262, 264, 266 execute on a non-deterministic operating system the virtual machines 262, 264, 266 may not be able to provide a deterministic environment.

In order to impose a measure of determinism on the system one or more synchronization point ready events may be defined, at operation 315. As described above, in theory perfect synchronization could be achieved by requiring synchronization between processes executing on virtual machines 262, 264, 266 with each clock cycle. In practice, however, this would consume resources excessively and reduce the operating performance of computer system 200. Instead synchronization point ready events may be defined in the software which executes on virtual machines 262, 264, 266. When the software reaches a synchronization ready event the virtual machine sends a ready event signal to the hypervisor module 260.

Figure 4:
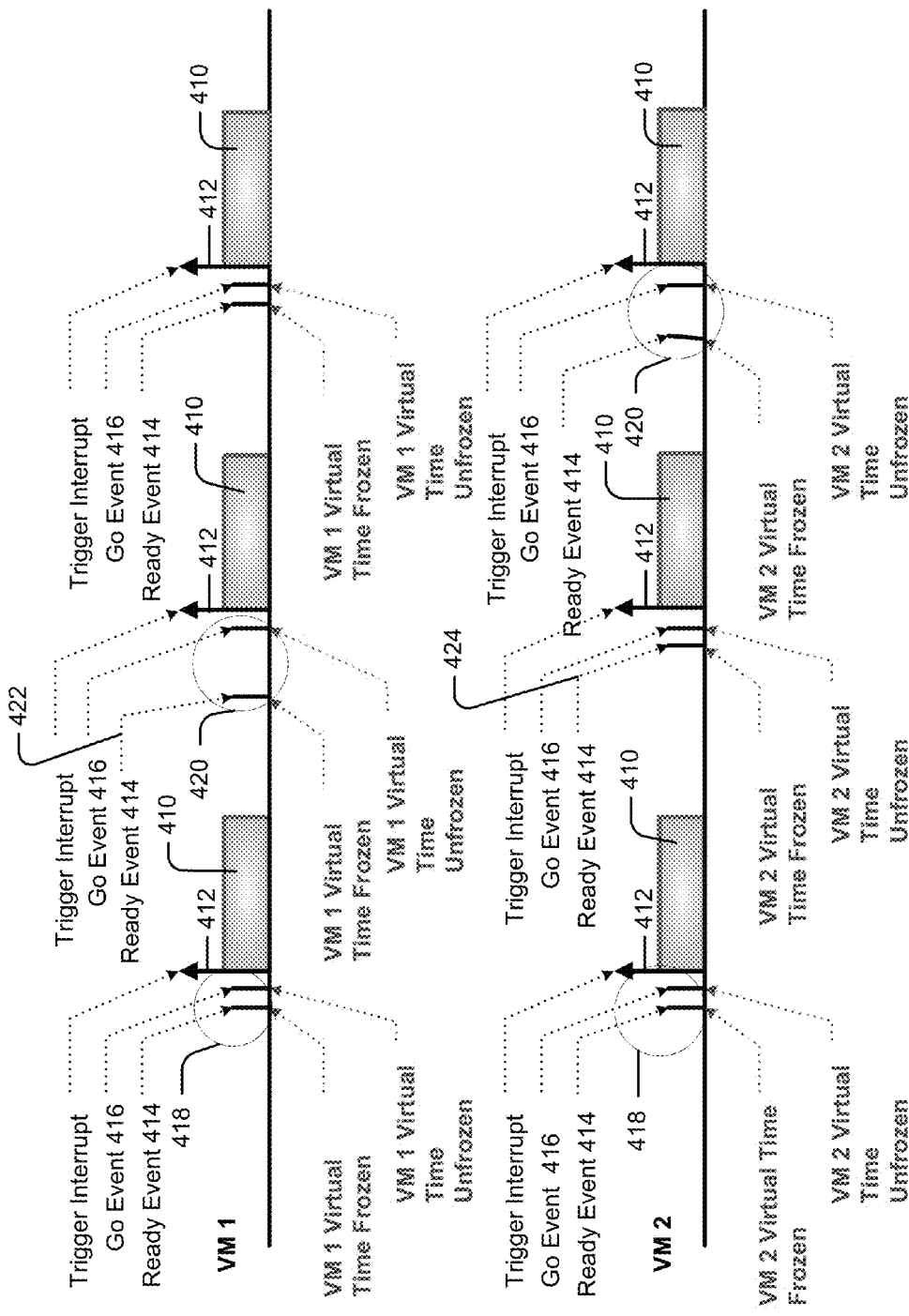
FIGS. 4-7 are timing diagrams illustrating implementations of a method to synchronize software processes in a virtual machine environment, according to embodiments.

In some embodiments synchronization point ready events may be implemented at the start of a frame. FIG. 4 illustrates one embodiment of implementing a synchronization point at the start of a frame in order to synchronize operations of virtual machines. Referring to FIG. 4, operations on virtual machine VM 1 are executed in frames 410, the start of which are triggered by interrupt signals 412 from the timer for virtual machine VM 1. Similarly, operations on virtual machine VM 2 are executed in frames 410, the start of which are triggered by interrupt signals 412 from the timer for virtual machine VM 2. Thus, the start of the frames 410 may be defined as a synchronization point for operations executing on virtual machines VM 1 and VM 2.

Referring back to FIG. 3, at operation 320 processes are initiated on the virtual machines 262, 264, 266 which execute on system 200. In some embodiments the virtual machines 262, 264, 266 may implement software processes which generate a test platform for an aerospace environment as described with reference to FIG. 1. However, the specific processes are not critical and processes other than a test platform may be implemented.

At operation 325 the virtual machine itself monitors for a software or hardware activity of interest by the process running on the virtual machine that is to be synchronized on, when this occurs a synchronization ready event signal 414 is sent from the virtual machine to the hypervisor 260. By way of example, in the embodiment depicted in FIG. 4, virtual machine 1 sends a ready event signal 414 before the timer interrupt is triggered in VM 1. The timer interrupt 412 will not occur until after an Issue Go Event 340 is sent from the hypervisor 260. Typically the system is synchronous and the ready event, go event, and timer interrupt happen close together in wall clock time as is shown in 418. If the system is not synchronous the ready event 414 and go events 416 will not be close together in wall clock time as is shown in 420. Both 418 and 420 illustrate the activities in a synchronization point. Time inside the virtual machine, i.e., virtual time, will be frozen at the ready event 414 and unfrozen at the go event 416. Thus, from the perspective of the processes on the virtual machine 320, no virtual time passes in a synchronization point. If, at operation 325 there are no process activities that would require a ready event signals to the Hypervisor 260 then the virtual machines modules 262, 264, 266 simply continues monitoring the processes. By contrast, if at operation 325 a ready event signal has been received at the hypervisor module 260 the control passes to operation 335.

At operation 335 the hypervisor determines whether it has received ready event signals from all virtual machines executing the process. If it has not received ready event signals from all virtual machines executing the process then the hypervisor module 260 simply continues monitoring the processes. VM 1 ready event 422 illustrates where VM 1 is ready, but VM 2 ready event 424 has not occurred yet, system execution remains at operation 335 until all ready events have been received. By contrast, if at operation 335 the hypervisor has received ready event signals from all the virtual machines executing the process then the hypervisor 260 issues a go event signal 416, which is provided to the virtual machines executing the process.

Referring back to the example illustrated in FIG. 4, processing is suspended on virtual machine 1 after it sends a ready event signal 414 to the hypervisor module 260 when it is ready to initiate processing of another frame, effectively freezing virtual time on virtual machine 1 until a ready event 414 signal is received from virtual machine 2, thereby synchronizing execution of frames between virtual machine 1 and virtual machine 2. Similarly, processing is suspended on virtual machine 2 after it sends a ready event signal 414 to the hypervisor module 260 when it is ready to initiate processing of another frame, effectively freezing virtual time on virtual machine 2 until a ready event signal 414 is received from virtual machine 1 thereby synchronizing execution of frames between virtual machine 1 and virtual machine 2. Freezing virtual time as illustrated in FIG. 4 effectively removes inter-frame jitter between virtual machines executing the process.

Figure 5:
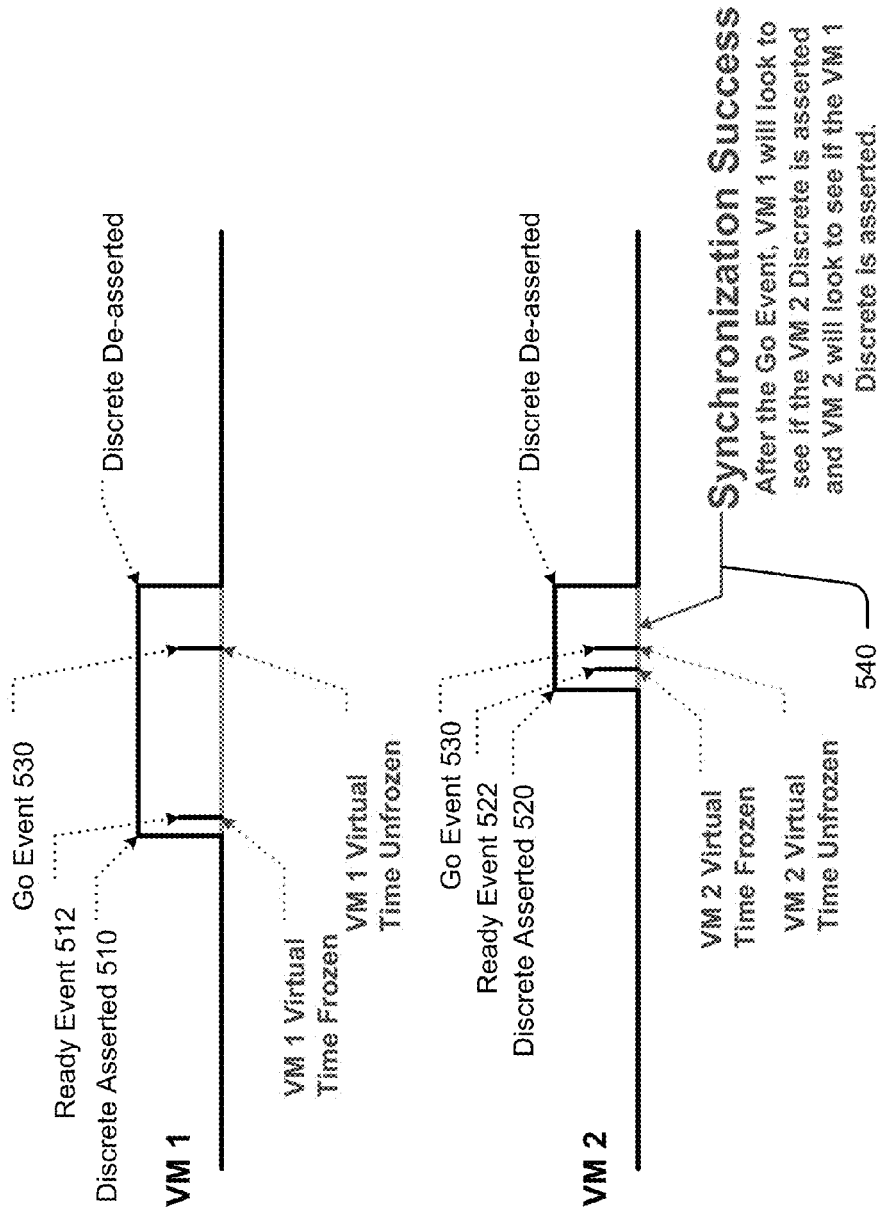

Synchronization points may be implemented at other process points. FIG. 5 illustrates an example in which synchronization may be imposed in conjunction with the assertion of discretes by virtual machines. Referring to FIG. 5, when the first virtual machine VM 1 asserts a discrete 510 it provides a ready event signal 512 to the hypervisor 260 and suspends processing, effectively freezing virtual time on virtual machine 1. When virtual machine VM 2 asserts a discrete 520 it provides a ready event 522 signal to the hypervisor 260, which then responds with a go event signal 530 to both VM 1 and VM 2. In response to the go event 530 virtual time is unfrozen on virtual machine 1 and virtual machine 2. Accordingly a synchronization point at the assertion of the discrete imposes synchronization between virtual machine VM 1 and virtual machine VM 2. In the FIG. 5 example, the discretes are used in cross-channel synchronization, so the processes 320 running on the VM 1 and VM 2 will look at the other VM at time 540 and will see the corresponding discretes asserted indicating a synchronization success.

Figure 6:
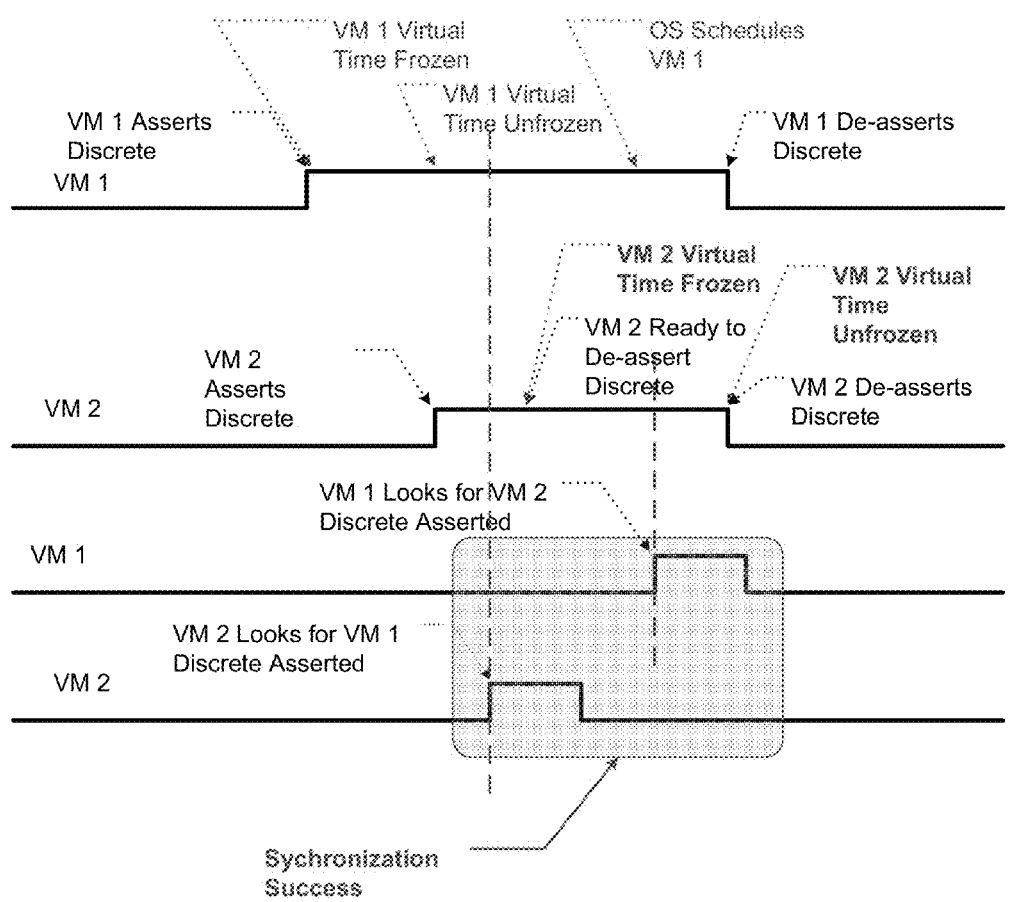
Figure 7:
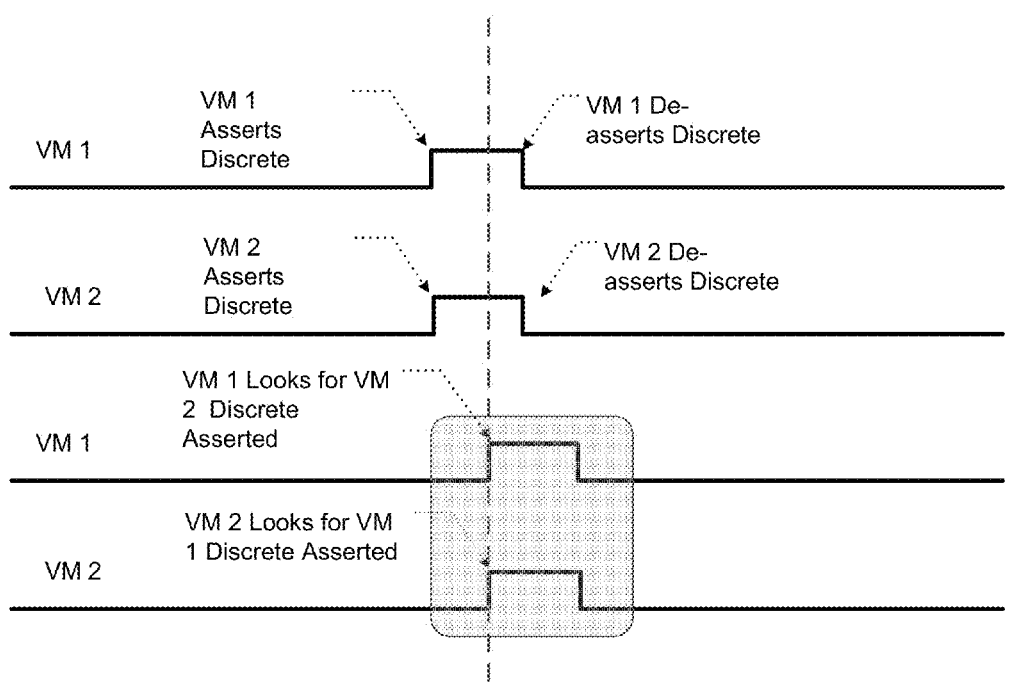

FIG. 6 continues from the discrete assertion in FIG. 5. In this case, if another synchronization point is not placed at the discrete de-assertion then it is possible that when the other VM looks for this discrete to be asserted, it might not observe that the discrete was asserted. Even though VM 1 and VM 2 are synchronized at the discrete assertion, it is possible that when VM 1 has its virtual time unfrozen, that the general purpose operating system (e.g. Windows) does not schedule the VM 1 to execute right away after virtual time is unfrozen. This can cause too much virtual time to elapse before the discretes are looked at by the software in the VMs and lead to a synchronization loss.

If another synchronization point is added at discrete de-assertion, it will guarantee that the discrete is observed asserted in both VM 1 and VM 2. In the discrete de-assertion, the ready event occurs before the actual discrete de-assertion in the VM. In FIG. 6 VM 2 is ready to de-assert its discrete before VM 1 has looked for that discrete to be asserted by VM 2. Once a synchronization point is added at the discrete de-assertion, the discrete remains asserted in VM 2 until VM 1 is ready to de-assert its discrete. Once a ready event has been received for discrete de-assertion by both VM 1 and VM 2, the hypervisor 260 issues a go event to VM 1 and VM 2, virtual time is unfrozen, and the discrete is de-asserted.

FIG. 6 shows events in terms of wall clock time. So, the synchronization event looks skewed in time. If FIG. 6 were to be redrawn in terms of virtual time everything would line up in time and it would look like FIG. 7. Events line up because virtual time is being frozen in synchronization points. When viewed from the virtual time perspective it is easier to see how everything lines up and is synchronized.

Thus, described herein is a computer based system and method to synchronize software processes in a virtual machine environment. In brief, virtual machines generate ready event signals which are provided to a hypervisor module at predetermined times or events in a software process and then suspend processing of the software on the virtual machine. The hypervisor module waits until it receives ready events from all virtual machines executing the process to issue a go event signal to the virtual machines. In response to the go event signal, the virtual machines initiate processing. Events may be scheduled to coincide with, e.g., the start of another frame processing for either major frames or minor frames, cross-channel communication events such as serial input/output messages, or the like. For example, in some embodiments logic instructions further configure the at least one processor to freeze virtual time in the first virtual machine after sending a serial input/output message in the first virtual machine until the second virtual machine has sent a corresponding input/output message. The actual event in the virtual machine may occur before the ready event in some synchronization point designs or after the go event in other synchronization point designs.

In the foregoing discussion, specific implementations of exemplary processes have been described, however, it should be understood that in alternate implementation, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A computer system, comprising:
a memory comprising instructions that when executed by a processor cause the processor to perform operations including;
synchronizing timing of execution of first operations of a first virtual machine executing on the processor and second operations of a second virtual machine executing on the processor by:
receiving a first ready signal from the first virtual machine based on the first virtual machine reaching a first cross-channel operation of the first operations, the first cross-channel operation including asserting a first value at the first virtual machine;
receiving a second ready signal from the second virtual machine based on the second virtual machine reaching a second cross-channel operation of the second operations, the second cross-channel operation including asserting a second value at the second virtual machine; and
after receiving the first ready signal and the second ready signal, transmitting a first go signal to the first virtual machine and a second go signal to the second virtual machine, wherein the first virtual machine checks the second value in response to the first go signal, and wherein the second virtual machine checks the first value in response to the second go signal.

2. The computer system of claim 1, wherein synchronizing timing of execution of the first operations of the first virtual machine and the second operations of the second virtual machine further includes:
   after transmitting the first go signal, receiving a third ready signal from the first virtual machine based on the first virtual machine reaching a third cross-channel operation of the first operations, the third cross-channel operation including de-asserting the first value at the first virtual machine;
   after transmitting the second go signal, receiving a fourth ready signal from the second virtual machine based on the second virtual machine reaching a fourth cross-channel operation of the second operations, the fourth cross-channel operation including de-asserting the second value at the second virtual machine; and
   after receiving the third ready signal and the fourth ready signal, transmitting a third go signal to the first virtual machine and a fourth go signal to the second virtual machine.

3. The computer system of claim 1, wherein synchronizing timing of execution of the first operations of the first virtual machine and the second operations of the second virtual machine further includes:
   receiving a third ready signal from the first virtual machine based on the first virtual machine reaching a first processing frame, wherein the first virtual machine performs the first operations during the first processing frame;
   receiving a fourth ready signal from the second virtual machine based on the second virtual machine reaching a second processing frame, wherein the second virtual machine performs the second operations during the second processing frame, wherein the first operations correspond to the second operations; and
   after receiving the third ready signal and the fourth ready signal, transmitting a third go signal to the first virtual machine and a fourth go signal to the second virtual machine.

4. The computer system of claim 3, wherein the first processing frame is defined based on a first timer associated with the first virtual machine, wherein the second processing frame is defined based on a second timer associated with the second virtual machine, wherein the first timer freezes when the first virtual machine transmits the third ready signal, wherein the second timer freezes when the second virtual machine transmits the fourth ready signal, wherein the first timer unfreezes when the first virtual machine receives the third go signal, and wherein the second virtual machine unfreezes when the second virtual machine receives the fourth go signal.

5. The computer system of claim 4, wherein the first timer freezes when the first virtual machine transmits the first ready signal, wherein the second timer freezes when the second virtual machine transmits the second ready signal, wherein the first timer unfreezes when the first virtual machine receives the first go signal, and wherein the second virtual machine unfreezes when the second virtual machine receives the second go signal.

6. The computer system of claim 1, wherein the first go signal and the second go signal are transmitted by a hypervisor.

7. The computer system of claim 6, wherein the hypervisor receives the first ready signal and the second ready signal.

8. A computer-based method, comprising:
   synchronizing timing of execution of first operations of a first virtual machine executing on a processor and second operations of a second virtual machine executing on the processor by:
      receiving a first ready signal from the first virtual machine based on the first virtual machine reaching a first cross-channel operation of the first operations, the first cross-channel operation including asserting a first value at the first virtual machine;
      receiving a second ready signal from the second virtual machine based on the second virtual machine reaching a second cross-channel operation of the second operations, the second cross-channel operation including asserting a second value at the second virtual machine; and
      after receiving the first ready signal and the second ready signal, transmitting a first go signal to the first virtual machine and a second go signal to the second virtual machine, wherein the first virtual machine checks the second value in response to the first go signal, and wherein the second virtual machine checks the first value in response to the second go signal.

9. The computer-based method of claim 8, wherein synchronizing timing of execution of the first operations of the first virtual machine and the second operations of the second virtual machine further includes:
   after transmitting the first go signal, receiving a third ready signal from the first virtual machine based on the first virtual machine reaching a third cross-channel operation of the first operations, the third cross-channel operation including de-asserting the first value at the first virtual machine;
   after transmitting the second go signal, receiving a fourth ready signal from the second virtual machine based on the second virtual machine reaching a fourth cross-channel operation of the second operations, the fourth cross-channel operation including de-asserting the second value at the second virtual machine; and
   after receiving the third ready signal and the fourth ready signal, transmitting a third go signal to the first virtual machine and a fourth go signal to the second virtual machine.

10. The computer-based method of claim 8, wherein synchronizing timing of execution of the first operations of the first virtual machine and the second operations of the second virtual machine further includes:
   receiving a third ready signal from the first virtual machine based on the first virtual machine reaching a first processing frame, wherein the first virtual machine performs the first operations during the first processing frame;
   receiving a fourth ready signal from the second virtual machine based on the second virtual machine reaching a second processing frame, wherein the second virtual machine performs the second operations during the second processing frame, wherein the first operations correspond to the second operations; and
   after receiving the third ready signal and the fourth ready signal, transmitting a third go signal to the first virtual machine and a fourth go signal to the second virtual machine.

11. The computer-based method of claim 10, wherein the first processing frame is defined based on a first timer associated with the first virtual machine, wherein the second processing frame is defined based on a second timer associated with the second virtual machine, wherein the first timer freezes when the first virtual machine transmits the third ready signal, wherein the second tinier freezes when the second virtual machine transmits the fourth ready signal, wherein the first timer unfreezes when the first virtual machine receives the third go signal, and wherein the second virtual machine unfreezes when the second virtual machine receives the fourth go signal.

12. The computer-based method of claim 11, wherein the first timer freezes when the first virtual machine transmits the first ready signal, wherein the second timer freezes when the second virtual machine transmits the second ready signal, wherein the first tinier unfreezes when the first virtual machine receives the first go signal, and wherein the second virtual machine unfreezes when the second virtual machine receives the second go signal.

13. The computer-based method of claim 8, wherein the first go signal and the second go signal are transmitted by a hypervisor.

14. The computer-based method of claim 13, wherein the hypervisor receives the first ready signal and the second ready signal.

15. A non-transitory computer-readable medium comprising instructions executable by a processor to perform operations including:
synchronizing timing of execution of first operations of a first virtual machine executing on the processor and second operations of a second virtual machine executing on the processor by:
receiving a first ready signal from the first virtual machine based on the first virtual machine reaching a first cross-channel operation of the first operations, the first cross-channel operation including asserting a first value at the first virtual machine;
receiving a second ready signal from the second virtual machine based on the second virtual machine reaching a second cross-channel operation of the second operations, the second cross-channel operation including asserting a second value at the second virtual machine; and
after receiving the first ready signal and the second ready signal, transmitting a first go signal to the first virtual machine and a second go signal to the second virtual machine, wherein the first virtual machine checks the second value in response to the first go signal, and wherein the second virtual machine checks the first value in response to the second go signal.

16. The non-transitory computer-readable medium of claim 15, wherein synchronizing timing of execution of the first operations of the first virtual machine and the second operations of the second virtual machine further includes:
after transmitting the first go signal, receiving a third ready signal from the first virtual machine based on the first virtual machine reaching a third cross-channel operation of the first operations, the third cross-channel operation including de-asserting the first value at the first virtual machine;
after transmitting the second go signal, receiving a fourth ready signal from the second virtual machine based on the second virtual machine reaching a fourth cross-channel operation of the second operations, the fourth cross-channel operation including de-asserting the second value at the second virtual machine; and
after receiving the third ready signal and the fourth ready signal, transmitting a third go signal to the first virtual machine and a fourth go signal to the second virtual machine.

17. The non-transitory computer-readable medium of claim 15, wherein synchronizing timing of execution of the first operations of the first virtual machine and the second operations of the second virtual machine further includes:
receiving a third ready signal from the first virtual machine based on the first virtual machine reaching a first processing frame, wherein the first virtual machine performs the first operations during the first processing frame;
receiving a fourth ready signal from the second virtual machine based on the second virtual machine reaching a second processing frame, wherein the second virtual machine performs the second operations during the second processing frame, wherein the first operations correspond to the second operations; and
after receiving the third ready signal and the fourth ready signal, transmitting a third go signal to the first virtual machine and a fourth go signal to the second virtual machine.

18. The non-transitory computer-readable medium of claim 17, wherein the first processing frame is defined based on a first timer associated with the first virtual machine, wherein the second processing frame is defined based on a second timer associated with the second virtual machine, wherein the first timer freezes when the first virtual machine transmits the third ready signal, wherein the second timer freezes when the second virtual machine transmits the fourth ready signal, wherein the first timer unfreezes when the first virtual machine receives the third go signal, and wherein the second virtual machine unfreezes when the second virtual machine receives the fourth go signal.

19. The non-transitory computer-readable medium of claim 18, wherein the first timer freezes when the first virtual machine transmits the first ready signal, wherein the second timer freezes when the second virtual machine transmits the second ready signal, wherein the first timer unfreezes when the first virtual machine receives the first go signal, and wherein the second virtual machine unfreezes when the second virtual machine receives the second go signal.

20. The non-transitory computer-readable medium of claim 15, wherein the first go signal and the second go signal are transmitted by a hypervisor.

* * * * *